United States Patent [19]

Chung

[11] Patent Number: 5,427,058
[45] Date of Patent: Jun. 27, 1995

[54] WATERING VALVE FOR USE IN WATER FEEDERS FOR SMALL ANIMALS

[76] Inventor: Hwei-An Chung, 6 Fl., No. 98-8, Wu-Lang St., West District, Taichung, Taiwan, Taiwan

[21] Appl. No.: 267,915

[22] Filed: Jul. 6, 1994

[51] Int. Cl.⁶ ............................................. A01K 7/06
[52] U.S. Cl. ............................................. 119/72.5
[58] Field of Search .................... 119/72, 72.5, 75; 251/339, 325; 222/507, 501, 509

[56] References Cited

U.S. PATENT DOCUMENTS

| | | | |
|---|---|---|---|
| 3,322,101 | 5/1967 | Eagles et al. | 119/72.5 |
| 3,734,063 | 5/1973 | Atchley | 119/72.5 |
| 4,329,941 | 5/1982 | Niki | 119/72.5 |
| 4,416,221 | 11/1983 | Novey | 119/72.5 |
| 4,984,537 | 1/1991 | Steudler, Jr. | 119/72.5 |

FOREIGN PATENT DOCUMENTS

| | | | |
|---|---|---|---|
| 904690 | 7/1972 | Canada | 119/72.5 |
| 943415 | 3/1974 | Canada | 119/72.5 |
| 1286136 | 1/1987 | U.S.S.R. | 119/72 |

*Primary Examiner*—Todd E. Manahan
*Attorney, Agent, or Firm*—Morton J. Rosenberg; David I. Klein

[57] ABSTRACT

A watering valve of a water feeder includes a casing fastened to an outlet pipe for connection to a water reservoir and having a gasket ring engaged in the top. A water stopper is engaged in the upper portion of the casing and includes a head engaged against the gasket ring, and a water nozzle engaged in the lower portion of the casing. The water stopper is disengaged from the gasket ring when the water nozzle is pushed upwards by a small animal, causing water to flow through the water stopper and to flow out of the water nozzle.

1 Claim, 4 Drawing Sheets

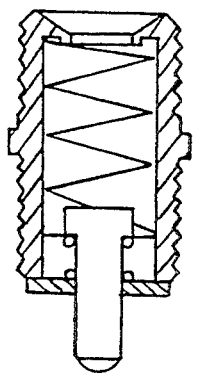
Fig. 1 PRIOR ART
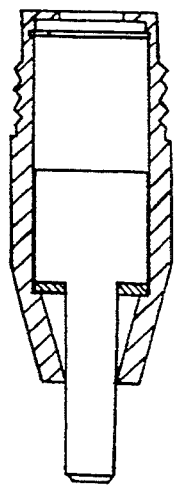 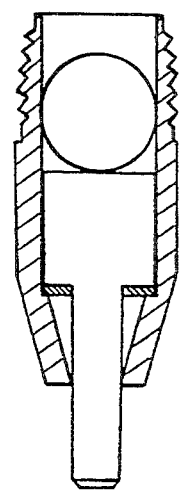
Fig. 2 PRIOR ART    Fig. 3 PRIOR ART

WATERING VALVE FOR USE IN WATER FEEDERS FOR SMALL ANIMALS

BACKGROUND OF THE INVENTION

The present invention relates to a water outlet control device for controlling the water outlet of an automatic livestock waterer, and relates more particularly to such a water outlet control device which reduces the pressure of water passing through.

Various automatic livestock waterers are well-known and intensively used to supply water for livestock economically. These automatic livestock waterers commonly equipped with a water outlet control device to control the water outlet. FIG. 1 shows a prior art water outlet control device for this purpose, which comprises a casing fastened to the water outlet pipe, a headed water stopping rod having a head disposed inside the casing and a rod body extended out of the casing through a water outlet on the casing, and a spring fastened inside the casing and engaged against the head of the headed water stopping rod. Because the headed water stopping rod is forced downwards by the spring, the water outlet is sealed by the head of the headed water stopping rod. This structure of water outlet control device is functional, however it is not suitable for young or small farm animals, because young or small farm animal cannot easily push the headed water stopping rod upwards to compress the spring for letting water pass through the water outlet of the casing.

FIG. 2 shows another structure of water outlet control device according to the prior art which comprises a casing and a water stopping rod disposed inside the casing and having a bottom extension extended out of the bottom water outlet of the casing, a C-shaped clamp fastened around the inside wall of the casing to limit the upward movement of the water stopping rod, and a water seal ring mounted around the water stopping rod. One drawback of this structure of water outlet control device is that the water seal ring will wear away within a short period after the installation of the device. Another drawback of this structure of water outlet control device is that installation of the C-shaped clamp is difficult.

FIG. 3 illustrates still another structure of water outlet control device according to the prior art, which comprises a casing, a water stopping rod suspended within the casing and mounted with a water seal ring, and a ball disposed inside the casing above the water stopping rod. When in use, the water seal ring wears away quickly. Furthermore, if the farm animal gives a sudden push to the water stopping rod, the inward top flange of the casing may be damaged by the ball causing the ball to be pushed out of the casing.

The aforesaid prior art water outlet control devices have still a common drawback. Because the water passage through the casing reduces toward the water outlet, the pressure of water increases when water flows out of the casing. Because of high pressure water output, farm animals may be unwilling to drink water.

SUMMARY OF THE INVENTION

The present invention has been accomplished under the circumstances in view. It is therefore an object of the present invention to provide a water outlet control device which reduces the pressure of water passing through. It is another object of the present invention to provide a water outlet control device which is durable in use. It is still another object of the present invention to provide a water outlet control device which does not affect the willingness of farm animals to drink water. It is still another object of the present invention to provide a water outlet control device which prevents the water outlet from being blocked by miscellaneous substances in the mouth of the farm animal during its drinking.

To achieve these objects, there is provided a water outlet control device comprised of a casing fastened to the outlet pipe of an automatic livestock waterer, a water nozzle suspended within the casing at the bottom, a gasket ring mounted on the casing at the top, and a water stopper having a head stopped at the gasket ring at the top and a bottom end inserted into a hole on the casing and connected to the water nozzle through a screw joint. The diameter of the water passage through the water nozzle is bigger than that of the water stopper so that water pressure is reduced when passing through the water nozzle. This arrangement also prevents the water nozzle from being blocked up by substances carried in the mouth of the livestock. The water stopper is lifted from the gasket ring when the water nozzle is pushed upwards by a farm animal, and therefore water is allowed to flow from the automatic livestock waterer out of the water nozzle through a water passage on the water stopper.

BRIEF DESCRIPTION OF THE DRAWINGS

FIG. 1 illustrates a water outlet control device according to the prior art;

FIG. 2 illustrates another structure of water outlet control device according to the prior art;

FIG. 3 illustrates still another structure of water outlet control device according to the prior art;

DETAILED DESCRIPTION OF THE PREFERRED EMBODIMENTS

Figure 4:
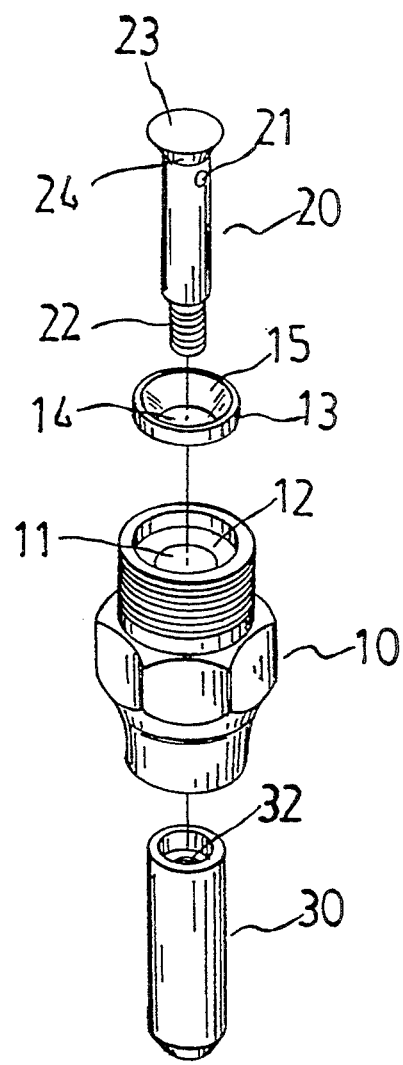
FIG. 4 is an exploded view of a water outlet control device according to the present invention.
Figure 5:
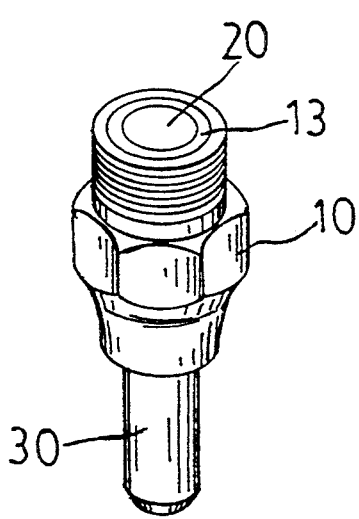
FIG. 5 is an elevational view of the water outlet control device shown in FIG. 4.
Figure 6:
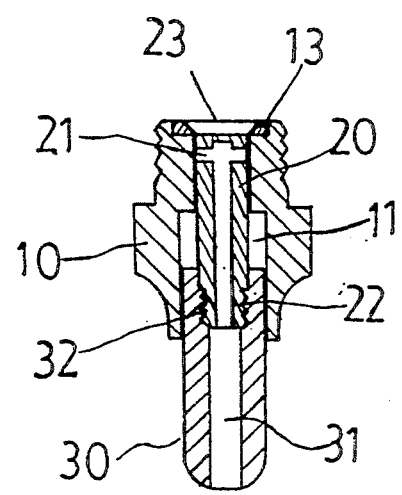
FIG. 6 is a longitudinal view in section of the water outlet control device shown in FIG. 5.

Referring to FIGS. 4, 5, and 6, a water outlet control device in accordance with the present invention is generally comprised of a casing 10, a water stopper 20, and a water nozzle 30. The casing 10 has a stepped through-hole 11 longitudinally disposed at the center, and an annular groove 12 disposed at the top around the stepped through-hole 11. The stepped through-hole 11 of the casing 10 comprises an upper section and a lower section of different diameters longitudinally aligned, wherein the diameter of the upper section is smaller than that of the lower section. A gasket ring 13 is mounted within the annular groove 12. The gasket ring 13 has a concave top wall 15 sloping toward the center through-hole 14 thereof. The diameter of the center through-hole 14 is equal to that of the upper section of the stepped through-hole 11. The water stopper 20 is made of cylindrical shape comprised of a T-shaped through-hole 21, a head 23 at one end, a unitary screw rod 22 at an opposite end, and a tapered surface 24 extended downwards and and inwards from the head 23 for fitting the concave top wall 15 of the gasket ring 13. The outer diameter of the water stopper 20 is approximately equal to the diameter of the center through-hole 14 of the gasket ring 15. The water nozzle 30 is made of cylindrical shape and of outer diameter approximately equal to the diameter of the lower section of the stepped through-hole 11, having a center through-hole 31 longitudinally disposed at the center and an inner thread 32 around the peripheral wall of the center through-hole 31 at the top. The diameter of the center through-hole 31 is bigger than that of the T-shaped through-hole 21. The assembly process of the water outlet control device is easy and done by: mounting the gasket ring 13 within the annular groove 12, then inserting the water stopper 20 and the water nozzle 30 into the stepped through-hole 11 from both ends, and then threading the screw rod 22 of the water stopper 20 into the inner thread 32 of the water nozzle 30.

Figure 7:
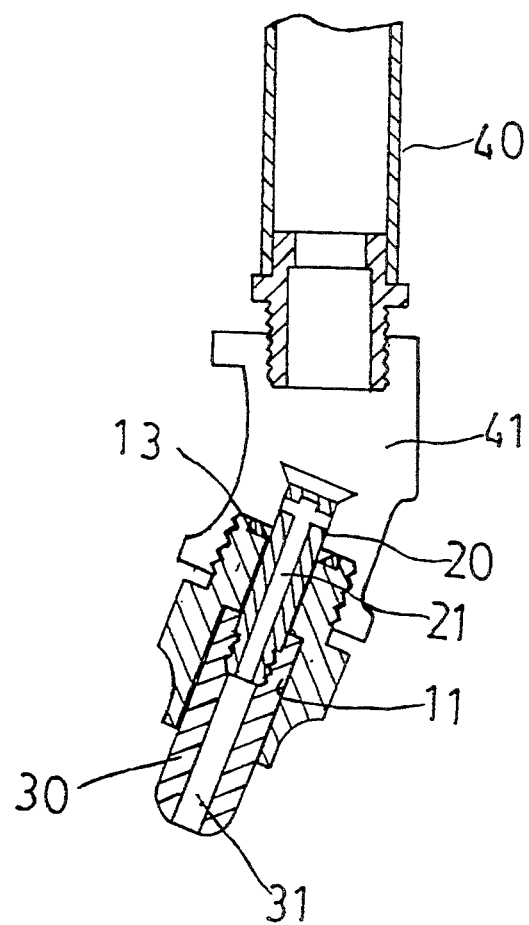
FIG. 7 is an installed view in section, showing the water outlet control device of the present invention fastened to the connector of the water outlet pipe of an automatic livestock waterer.

Referring to FIG. 7, the casing 10 is fastened to the water outlet pipe 40 of an automatic livestock waterer (not shown) by a connector 41. When installed, the head 23 of the water stopper 20 is forced down by water pressure, causing the center through-hole 14 of the gasket ring 13 to be stopped, and therefore water is stopped from passing through the water nozzle 30. When the farm animal pushes the water nozzle 30 upwards, the head 23 of the water stopper 20 is lifted from the gasket ring 13, and therefore water is allowed to flow out of the water nozzle 30 through the center through-hole 31 thereof via the T-shaped through hole 21 of the water stopper 20. When the farm animal goes away from the water nozzle 30, the head 23 of the water stopper 20 is forced to seal the water passage again.

Figure 8:
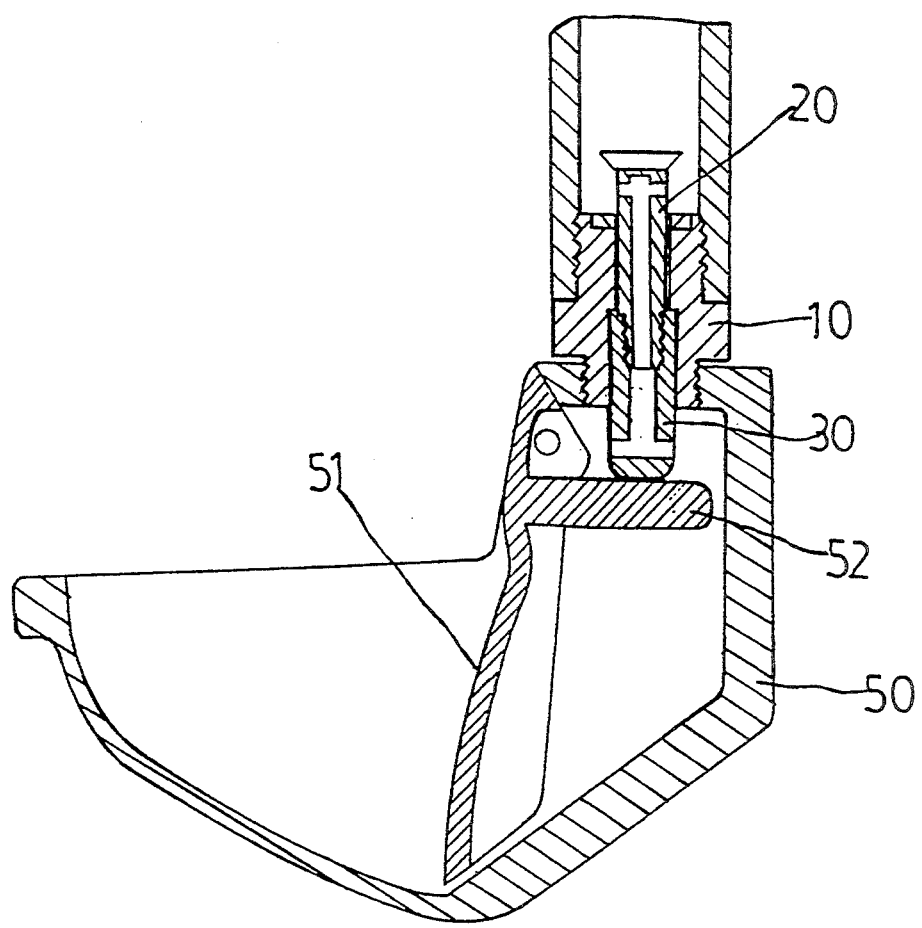
FIG. 8 shows an alternate form of the present invention.

Referring to FIG. 8, a cup-like drinking trough 50 may be fastened to the casing 10 of the water outlet control so that farm animals can drink water out of the the cup-like drinking trough 50 easily. The cup-like drinking trough 50 comprises an oscillating frame 51 pivotally disposed on the inside. The oscillating frame 51 has a top flange 52 disposed below the water nozzle 30. When the farm animal touches the oscillating frame 51, the water nozzle 20 is pushed upwards by the top flange 52 of the oscillating frame 51, and therefore the head 23 of the water stopper 20 is lifted from the gasket ring 13 for letting water pass through the water nozzle 30 into the cup-like drinking trough 51. When the farm animal goes away from the oscillating frame 51, the oscillating frame 51 is released from the water nozzle 30 and, the water stopper 20 is forced down again by water pressure, and therefore water is stopped from passing through the water nozzle 30.

I claim:

1. A watering valve for a water feeder comprising:

a casing for coupling to the water feeder and having a stepped center through-hole formed therein, said casing including an upper portion having an annular groove formed concentrically about said center through-hole;

a gasket ring disposed in said annular groove and having a center through-hole formed therein, said gasket ring having a concave top wall formed around said gasket ring center through-hole;

a water nozzle having a first water passage longitudinally formed therein, said first water passage including an upper portion having an inner thread formed therein; and a water stopper engaged through said center through-hole of said gasket ring and engaged in said stepped center through-hole of said casing, said water stopper including a lower portion having an outer thread formed thereon for engaging with said inner thread of said water nozzle, said water stopper including a second water passage formed therein and communicating with said first water passage of said water nozzle, said water stopper including an upper portion having a head formed thereon for engaging with said concave top wall of said gasket ring so as to fluidly block and to enclose said stepped center through-hole and so as to stop water flowing through said stepped center through-hole, said head including a tapered surface extended radially inward and downward for engagement with said concave top wall of said gasket ring so as to form a surface contact therebetween, said second water passage of said water stopper including a diameter smaller than that of said first water passage of said water nozzle for decreasing water pressure in said first water passage;

said head of said water stopper being disengaged from said gasket ring for allowing water flowing through said second water passage of said water stopper and flowing out through said first water passage of said water nozzle when said water nozzle is displaced toward said water stopper.

* * * * *